United States Patent [19]

Yamazaki

[11] Patent Number: 4,910,612
[45] Date of Patent: Mar. 20, 1990

[54] TWO-SIDED COPYING METHOD AND APPARATUS FOR A DIGITAL COPIER

[75] Inventor: Hideo Yamazaki, Tokyo, Japan

[73] Assignee: Ricoh Company, Ltd., Tokyo, Japan

[21] Appl. No.: 291,603

[22] Filed: Dec. 29, 1988

[30] Foreign Application Priority Data

Dec. 29, 1987 [JP] Japan .................................. 62-335274

[51] Int. Cl.⁴ .............................................. H04N 1/04
[52] U.S. Cl. .................................. 358/496; 358/4989; 358/444
[58] Field of Search ............... 358/401, 448, 498, 496; 355/26

[56] References Cited

U.S. PATENT DOCUMENTS

| | | | |
|---|---|---|---|
| 4,429,333 | 1/1984 | Davis et al. | 358/496 |
| 4,499,500 | 2/1985 | Nagashima | 358/448 |
| 4,571,636 | 2/1986 | Itoh | 358/498 |
| 4,743,974 | 5/1988 | Lockwood | 358/494 |
| 4,839,740 | 6/1989 | Yoshida | 358/448 |

*Primary Examiner*—Edward L. Coles, Sr.

*Attorney, Agent, or Firm*—Oblon, Spivak, McClelland, Maier & Neustadt

[57] ABSTRACT

A two-sided copying method and apparatus for a digital copier having an automatic document feeder (ADF) and a two-sided tray device. Documents sequentially fed by the ADF are read by a CCD image sensor and stored in a memory in the form of digital image data. The image data representative of odd pages of the documents are sequentially read out of the memory the highest-numbered page or the lowest-numbered page being first, the image data being printed out on one side of individual paper sheets. The resulting one-sided copies being temporarily stacked on a two-sided tray device. Then, the image data representative of even pages of the documents are sequentially read out of the memory with the lowest-numbered page or the highest-numbered page being first. The one-sided copies are refed one by one from the two-sided tray device the uppermost copy or the lowermost copy first, so that the image data associated with the even pages are reproduced on the other side of the individual one-sided copies. The resulting two-sided copies are driven out of the copier to a tray in the correct order of the pages.

12 Claims, 10 Drawing Sheets

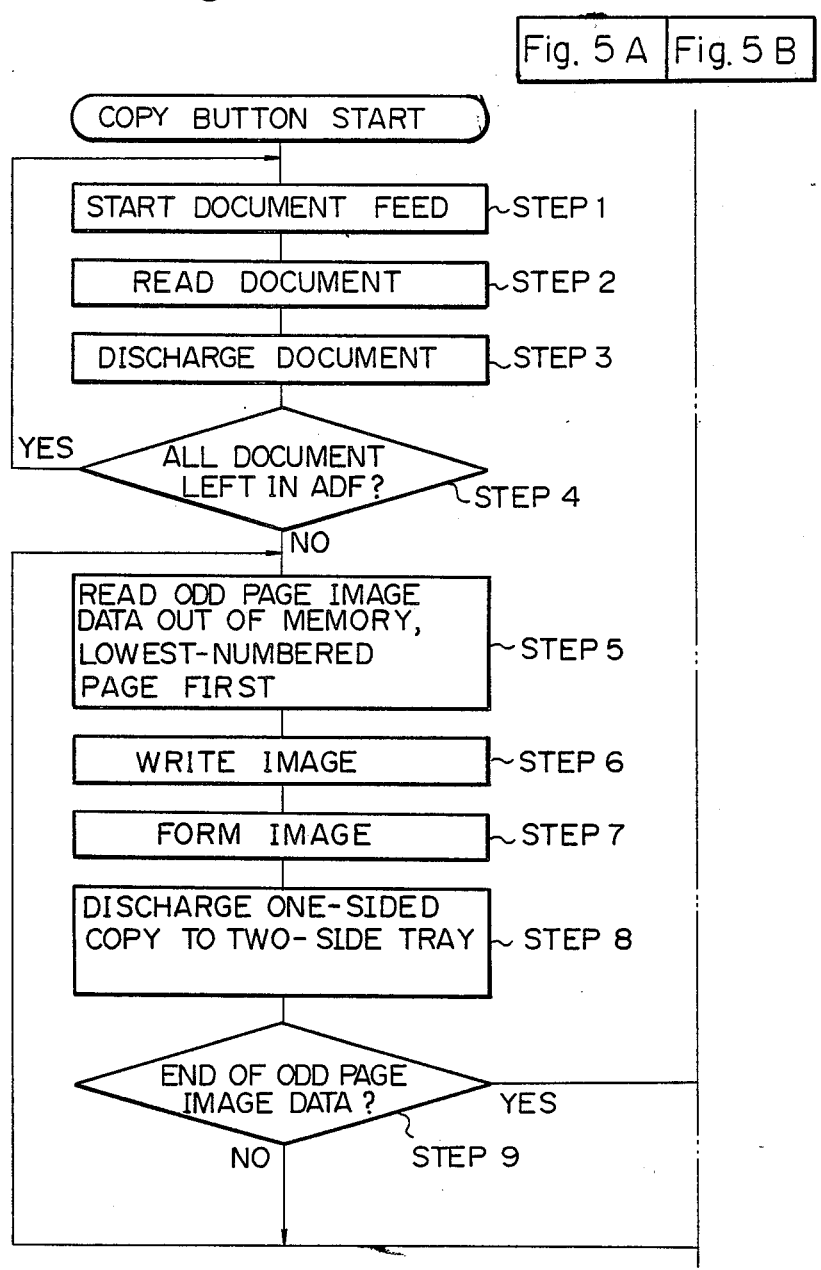

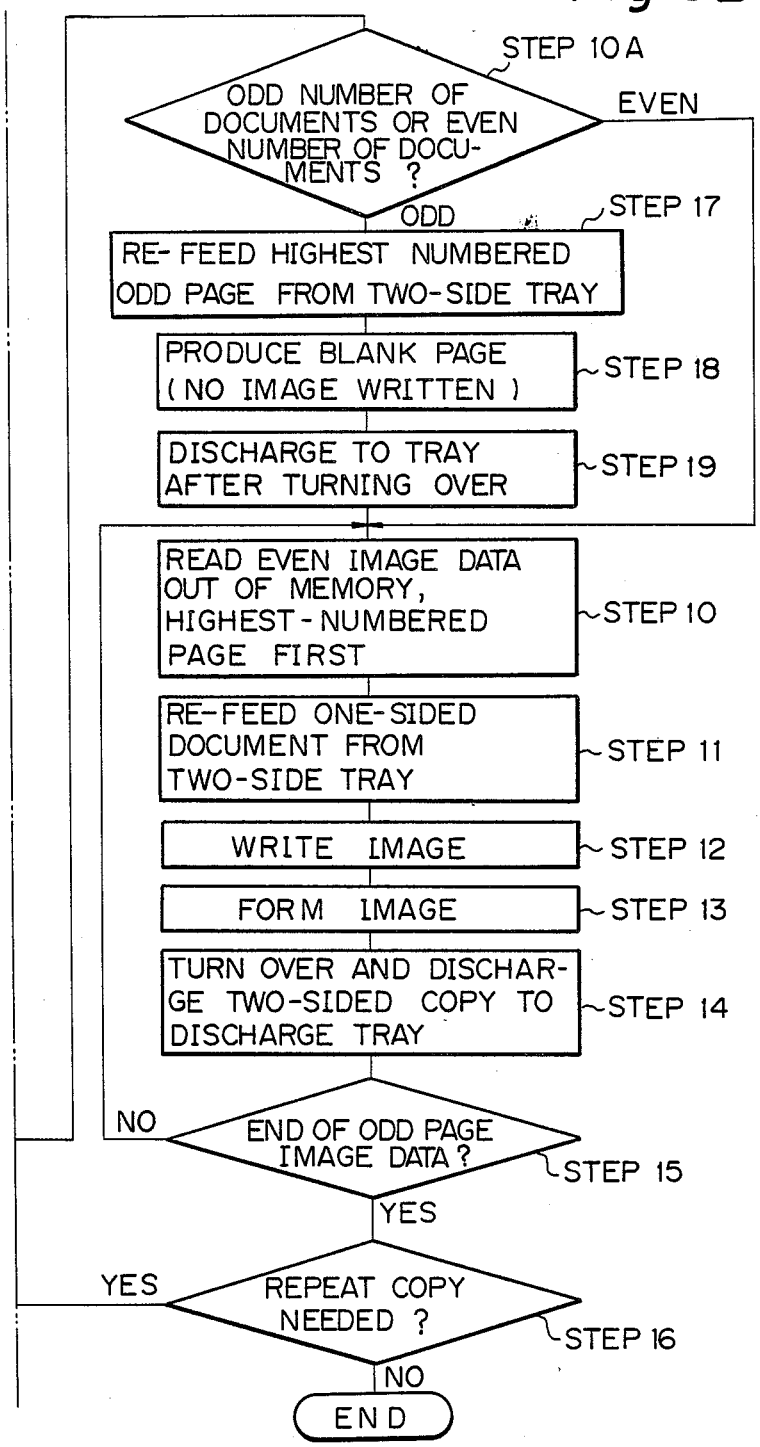

TWO-SIDED COPYING METHOD AND APPARATUS FOR A DIGITAL COPIER

BACKGROUND OF THE INVENTION

The present invention relates to a two-sided copying method and apparatus for an image recording apparatus of the type having a document feeder and, more particularly, to a two-sided copying method for a digital copier.

Some modern copiers are equipped with an automatic document feeder (ADF) for automatically feeding original documents one by one to a document support in the form of a glass platen and have the capability of producing copies each carrying images on both sides thereof, i.e. two-sided copies. Two-sided copying involves a variety of situations such as one in which the last page of documents which are to be reproduced on both sides of individual papers is odd and one in which it is even. A prior art two-sided copying method heretofore known in various forms is in many cases insufficient to match those situations to ordinary one-sided copying operations. For example, there has been known a two-sided copying method which causes an ADF to feed the first document to a glass platen, then reproduces the document on one side of a paper sheet, transports the resulting one-sided copy to a two-sided tray to store it temporarily, and then refeeds the one-sided copy while driving the ADF to feed the next document to the glass platen, thereby reproducing the subsequent document on the other side of the one-sided copy. A drawback with such prior art method is that the processing rate and therefore the efficiency achievable is extremely low, especially in a so-called one-to-one copy mode available for producing a single two-sided copy. Specifically, the processing rate of a copier for producing a single one-sided copy is usually 60% to 80% of the processing rate associated with a continuous copy mode, while the processing rate available for producing a single two-sided copy by the prior art two-sided copying procedure is as low as about 20% to 30%.

Another two-sided copying method known in the art is such that an ADF sequentially feeds a stack of documents to a glass platen, a document bearing the last page first. This kind of method has a shortcoming in that when the last page is an odd page, the back of the first two-sided copy, i.e., the back of the first page is left blank. Such shortcoming will of course be eliminated if an ADF is caused to sequentially feed documents to a glass platen, the first page of the first document first. Then, however, the resulting copies will be piled up on a copy tray with the last page atop the pile and will therefore require an extra mechanism for turning over the individual paper sheets to put them in order with respect to correct numbering of the pages. With a copier which lacks such a mechanism, therefore, it would be advantageous to feed documents sequentially to a glass platen, the last document bearing the last page first.

Further, a copier with a recycling ADF (RADF) is known which produces two-sided copies by causing the RADF to recycle individual documents. This type of copier adopts a method which drives the RADF to feed odd documents one at a time to a glass platen, reproduces the odd documents on one side of individual paper sheets, stacks the resulting one-sided copies on a two-sided tray, and refeeds the one-sided copies one by one from the two-sided tray while causing the RADF to feed even documents to the glass platen to reproduce them on the other side of the individual one-sided copies. While such a procedure successfully increases the processing rate to a certain degree, it involves the need for repetitively feeding each of the documents. More specifically, even the even documents have to be fed while the copying cycle is repeated with the odd documents, and vice versa. This is likely to bring about a problem of damage to the individual documents and therefore requires the reliability of operation of the RADF to be enhanced accordingly.

SUMMARY OF THE INVENTION

It is therefore an object of the present invention to provide a two-sided copying method and apparatus for a digital copier capable of increasing the processing rate in a two-sided copy mode which is implemented by an ADF.

It is another object of the present invention to provide a two-sided copying method for a digital copier which allows the pages of a stack of copies to be automatically put in order without regard to the last page of documents, which is either even or odd, and the transport system of an ADF.

It is another object of the present invention to provide a generally improved two-sided copying method for a digital copier.

A two-sided copying method of the present invention is applicable to an image recording apparatus for reproducing images of documents having a given number of pages on both sides of individual paper sheets to produce two-sided copies and discharging the two-sided copies in the correct order of pages. The method comprises the steps of reading the images of the documents in the form of image data, storing the image data, reading the stored image data representative of one of odd pages and even pages of the documents in a predetermined order of page, reproducing the read image data on one side of the individual paper sheets in the predetermined order of page to produce one-sided copies, reading the stored image data representative of the other of the odd pages and even pages in a predetermined order, sequentially refeeding the one-sided copies in a predetermined order, and reproducing the read image data on the other side of the individual paper sheets in the predetermined order to produce two-sided copies.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Preferred embodiments of the two-sided copying method and apparatus in accordance with the present invention will be described in detail with reference to the accompanying drawings. In the following description, a family of image recording apparatuses to which the present invention is applicable is represented by a digital copier by way of example. Therefore, reference will be made first to FIG. 1 which illustrates the general construction of a digital copier.

Figure 1:
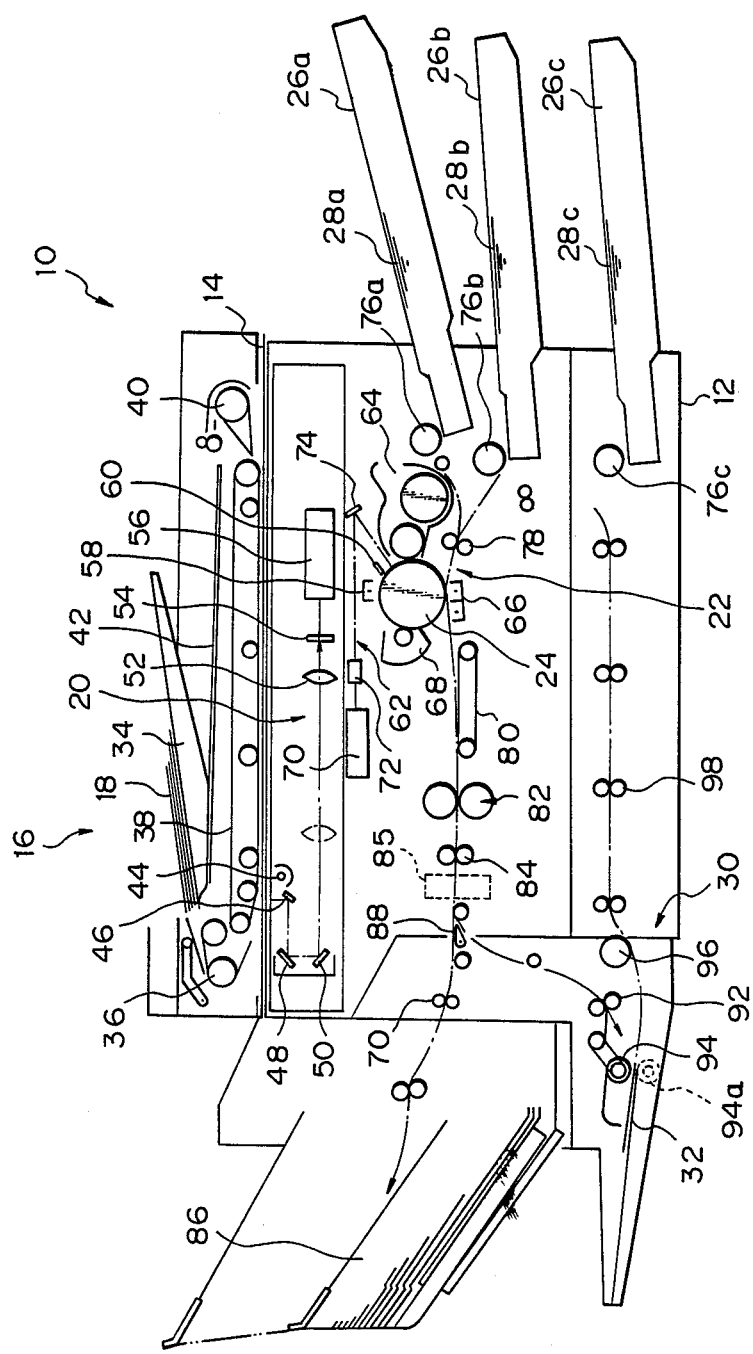
FIG. 1 is a sectional side elevation of a digital copier representative of a family of image recording apparatuses to which preferred embodiments of the present invention are applicable.

In FIG. 1, the digital copier, generally indicated by reference numeral 10, includes an ADF 16 which is openably disposed above a glass platen 14 of a copier body 12. The glass platen 14 plays the role of a document support. A document reading device or scanner 20 is provided for reading an original document 18 which is laid on the glass platen 14. An image forming device 22 is disposed in the copier body 12 and includes a photoconductive element in the form of a drum 24. A two-sided tray device 30 includes a two-sided tray 32 for sequentially temporarily stacking any of paper sheets 28a, 28b and 28c which are respectively loaded in cassettes 26a, 26b and 26c, so that the paper sheets carrying images on one side thereof may be refed from the device 30 as will be described in detail later.

As is well known in the art, the ADF 16 includes a document table 34 on which the documents 18 are loaded face up. The documents 18 are fed one by one by the ADF 16 and driven by a turn roller 36 or the like of the ADF 16 to the glass platen 14. On the glass platen 14, each document 18 is moved by a transport belt 38 to a predetermined position and stopped there. After the document 18 laid on the glass platen 14 has been scanned by the scanner 20, it is driven again by the transport belt 38 away from the glass platen 14. A reversing roller 40 drives the document 18 coming out of the glass platen 14 upward so that the document 18 is discharged onto a tray 42. Such sequence of document feeding steps are repeated for each of the documents 18 which are stacked on the document table 34.

The scanner 20 is made up of a lamp 44 for illuminating the document 18 which is positioned on the glass platen 14, a second mirror 46, a third mirror 48 and a fourth mirror 50, a lens 52, and a photoelectric transducer 54 which is implemented by a CCD (Charge Coupled Device) image sensor. The CCD image sensor 54 transforms an imagewise reflection from the document 18 into an electric digital signal, thereby reading an image which is printed on the document 18. An output signal or image data from the CCD image sensor 54 is delivered to an image processing unit 56 to undergo necessary image processing, the processed data being written in a memory (not shown) built in the unit 56.

Implemented by an ordinary electrophotographic principle, the image forming device 22 includes a main charger 58, an eraser 60, optics member 62 for writing, a developing unit 64, a transfer and separation charger 66, and a cleaning unit 68 which are sequentially arranged around the drum 24. The optics member 62 reads the image data out of the memory of the image processing unit 56 under the control of a controller 70, modulates a laser beam issuing from a laser (not shown) by the image data, deflects the modulated laser beam by a polygonal mirror 72, and causes a mirror 74 to reflect the deflected laser beam to optically write the image data on the drum 24, thereby forming a latent image electrostatically on the surface of the drum 24.

The paper cassettes 26a to 26c are mounted on the right-hand side of the copier body 12 as viewed in FIG. 1. Any of the paper sheets 28a to 28c loaded in the cassettes 26a to 26c, respectively, are fed by their associated feed roller 76a, 76b or 76c to a register roller 78 and temporarily stopped there. Each paper sheet 28 is driven by the register roller 78 toward a predetermined transfer station where the charger 66 is located at a predetermined time which is associated with the image carried on the drum 24. After the transfer of an image, the paper sheet 28 is separated from the drum 24, then delivered by a transport belt to a fixing unit 82 to fix the image thereon, and then driven by a discharge roller 84 to the left as viewed in the figure. Located at the discharge side of the discharge roller 84 are a two-side gate 88, a roller 90, and a tray 86. A paper reversing device 85 may be provided at an adequate point on a paper transport path which extends from the fixing unit 82 to the tray 86, e.g., at the position indicated by a phantom line in the figure so that a paper sheet which has undergone image transfer, especially fixation, may be turned over before reaching the tray 86.

The two-sided tray device 30 is disposed in a lower part of the copier 10 to refeed any of the paper sheets 28 each carrying an image on one side thereof to the transfer station. Whether to transport the paper sheet or one-sided copy 28 to the discharge tray 86 or transport it to the two-sided tray device 30 is determined by the two-sided gate 88. As shown, the two-sided tray device 30 is located on a path extending to the register roller 78 and includes a discharge roller 92, the two-sided tray 32, a pick-up roller 94, a refeed roller 96, and a transport roller 98. The two-sided tray device 30 has a capability such that the discharge roller 92 discharges the paper sheets 28 from above the two-sided tray 32 to sequentially stack them on the tray 32 and, in the event of refeed, the pick-up roller 94 drives the uppermost to the lowermost paper sheets 28 out of the tray 32 in this order. Another pick-up roller 94a may be used to refeed the lowermost to the uppermost paper sheets 28 from the tray 32 in this order, i.e., in the same order as the stacking order.

Embodiments of the two-sided copying method in accordance with the present invention which is applicable to the digital copier 10 will now be described in sequence.

FIRST EMBODIMENT

In a first embodiment, digital image data representative of the documents 18 and outputted by way of the ADF 16, scanner 20 and CCD image sensor 54 are written in the memory which is built in the image processing unit 56. Briefly, the image forming device 22 sequentially reproduces the odd pages of the documents 18 on one side of paper sheets 28 and then sequentially reproduces the even pages of the documents 18 on the other side of the same paper sheets 28. The odd pages are reproduced the highest-numbered page being first, and the even pages are reproduced the lowest-numbered page being first. Details of such procedure will be described with reference to FIG. 2.

Figure 2A:
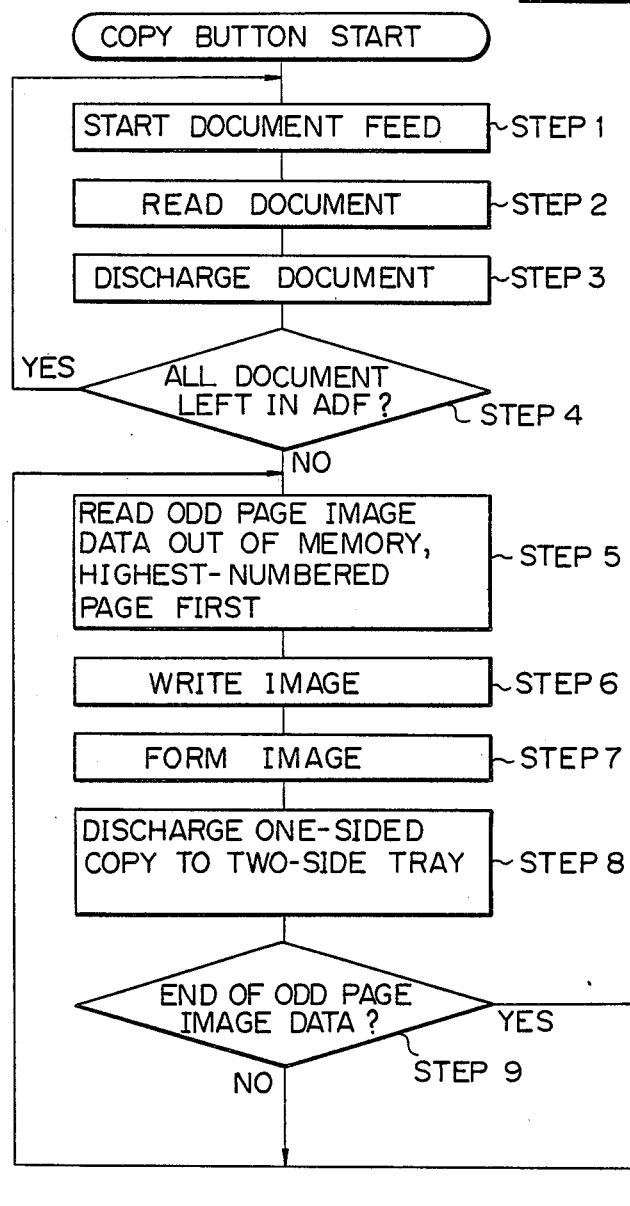
FIG. 2 is a flowchart demonstrating the operation of a first embodiment of the present invention.
Figure 2B:
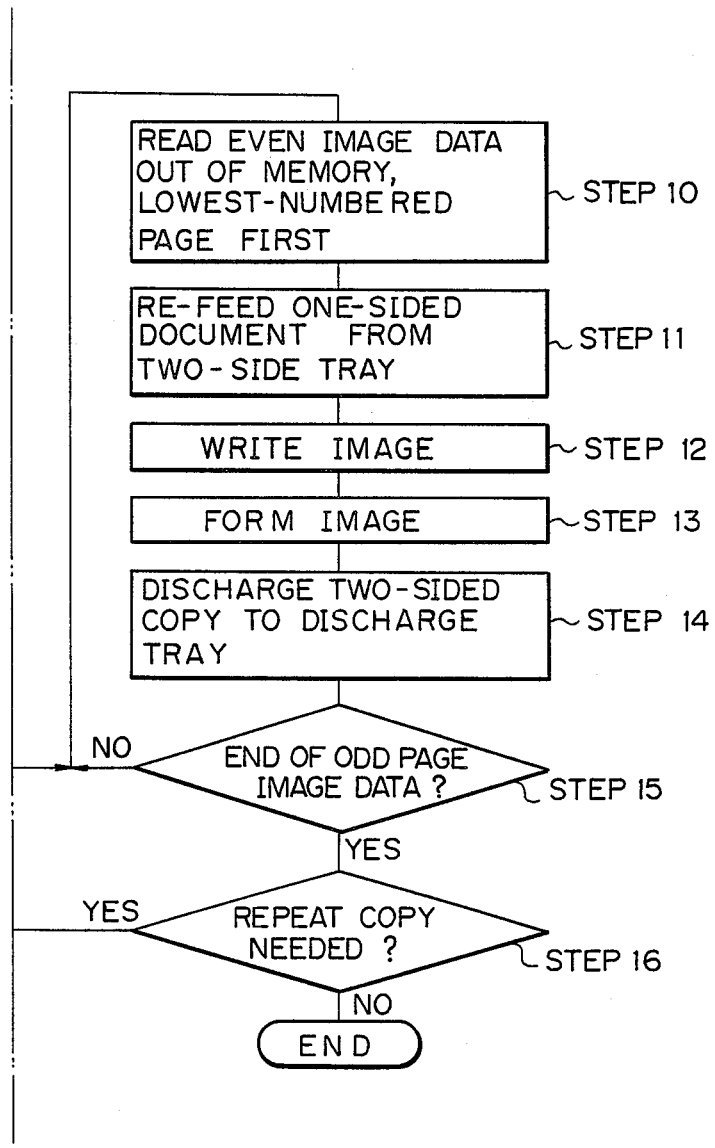

In FIG. 2, when a copy button (not shown) of the copier 10 is pressed, the documents 18 stacked face up on the document table 34 are sequentially fed by the ADF 16 to the glass platen 14 (STEP 1). The document 18 laid on the glass platen 14 is read by the CCD image sensor 54 of the scanner 20 and then stored in the memory of the image processing unit 56 in the form of digital image data (STEP 2). Such a reading operation is repeated for each of the successive pages of the documents 18. As the last of the documents 18 is read and memorized in the form of digital data, the reading step is ended by driving the last document 18 out of the glass platen 14. (STEPs 3 and 4).

Thereafter, the image forming device 22 is actuated to effect an image forming process. Specifically, the odd pages of the documents 18 are sequentially reproduced on one side of paper sheets 28 and, then, the even pages of the documents 18 are reproduced on the other side of the paper sheets 28. The image data representative of the odd pages are sequentially read out of the memory of the image processing unit 56, the highest-numbered odd page being first (STEP 5). The optics member 62 writes an image associated with the odd page in the drum 24 (STEP 6) and, then, the developing unit 64, transfer and separation charger 66 and fixing unit 82 cooperate to reproduce the image on one side of a paper sheet 28 (STEP 7). The resulting paper sheet or one-sided copy 28 is driven out to the two-sided tray 32 of the two-sided tray device 30 (STEP 8). These consecutive steps are sequentially repeated with, for example, the fifth page P5, third page P3 and first page P1 in this order. Hence, the one-sided copies 28 on the two-sided tray 32 are sequentially stacked in the order of the fifth page P5 to the first page P1.

After one-sided copies 28 each being associated with a different odd page have been produced and sequentially stacked on the one-sided tray 32 in the above-stated order, a procedure for reproducing the even pages on the other side of the one-sided copies 28 begins. While the image data representative of the even pages are sequentially read out of the memory in the same manner as the data associated with the odd pages, the former is read out in the reverse order to the latter, i.e. from the lowest-numbered page to the highest-numbered page such as the second page P2, then the fourth page P4 and then the sixth page P6 (STEP 10). This is followed by refeeding the one-sided copies 18 from the two-sided tray 32 (STEP 11). Since the one-sided copies 28 are sequentially refed in the order of the first page P1, third page P3 and fifth page P5 by the pick-up roller 94 which is located above the copies 28, the copying order in the event of reproduction on the other side of the copies 28 corresponds to the order of refeed from the two-sided tray 32 with respect to the pages. More specifically, the second page P2 is reproduced on the other side of the first page P1, the fourth page P4 on the other side of the third page P3, and the sixth page P6 on the other side of the fifth page P5. After the optics member 62 has written an image associated with any even page on the drum 24 (STEP 12), the developing unit 64, transfer and separation charger 66 and fixing unit 8 reproduce that image on the one-sided copy 18 (STEP 13). The resulting two-sided copy 28 is fed out to the discharge tray 86 (STEP 14). The two-sided copying procedure is completed as soon as all of the even pages are reproduced (STEP 15). When a repeat mode is selected, i.e., when it is desired to produce a plurality of sets of two-sided copies with the stack of documents 18 loaded on the document table 34 of the ADF 16 (STEP 16), the program is returned to STEP 5. More specifically, the step from the document transporting step to the document reading step are not repeated for each of the desired number of sets of two-sided copies and, instead, only the step of reading image data which have been stored in the memory by a single document transporting operation to the step of forming an image is repeated for the desired number of sets of copies. Hence, even in a repeat copy mode, the transport of the documents 18 by the ADF 16 and the image reading by the scanner 20, CCD image sensor 54 and image forming device 56 need only to be performed once each.

The embodiment of the present invention shown and described will be further discussed in relation to prior art two-side copying methods.

Figure 3A:
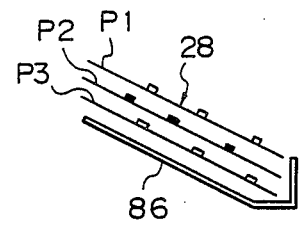
FIGS. 3A to 3D diagramatically illustrate specific conditions in which two-sided copies may be discharged by the prior art.
Figure 3B:
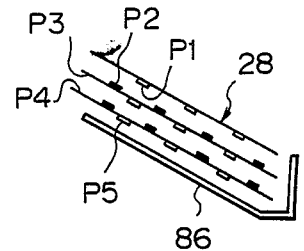

First, when use is made of an ADF of the type sequentially feeding documents from the last page to the first page and an ordinary one-sided copy mode is effected, the paper sheets or one-sided copies 28 are sequentially stacked face up on the discharge tray 86 in the regular order of the first page P1, second page P2, third page P3 and so on, as shown in FIG. 3A. However, when this type of ADF is used to produce two-sided copies with a stack of documents the last page of which is odd such as the fifth page P5, the back of the first page P1 which is the last odd page reproduced is left blank, as shown in FIG. 3B. It will at least appear more natural that the first to the fifth pages are reproduced in sequence and then followed by a blank page.

Figure 3C:
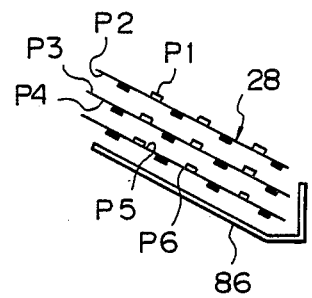
Figure 3D:
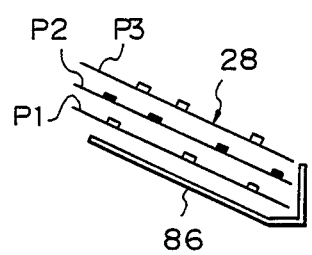

When a two-sided copy mode is effected by using an ADF of another type which sequentially feeds documents the first page first, the paper sheets 28 will be discharged in the sequence shown in FIG. 3C. As shown, whether the last page of the documents be even or odd, the copies 28 are stacked in the regular order with respect to pages on the discharge tray 86. However, when this type of ADF is operated in the usual one-side copy mode, the copies are stacked on the tray 86 in the reverse order with respect to pages, i.e., the last page or third page P3 atop the stack, as shown in FIG. 3D. This requires a person to rearrange the one-sided copies 28 to put them in order such that the first page is positioned on the top of the stack.

Figure 4A:
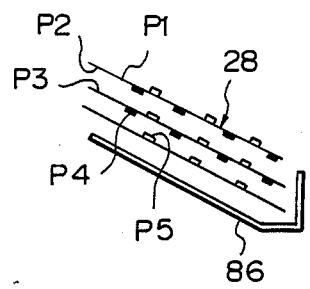
FIGS. 4A and 4B diagramatically illustrate how two-sided documents are discharged by any of the embodiments of the present invention.
Figure 4B:
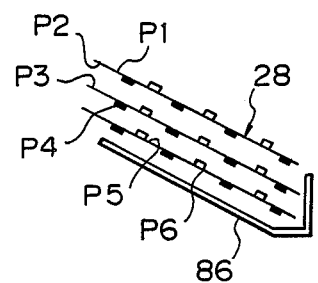

With the illustrative embodiment of the present invention, whether the ADF 16 be of the type transporting a document bearing the last page first or transporting a document bearing the first page first, the resulting copies in a two-sided copy mode are automatically put in order because they are produced as shown in FIG. 4A for those copies the last page of which is odd or as shown in FIG. 4B for those copies the last page of which is even. This prevents the back of the first page from being left blank even when a stack of documents the last page of which is odd are reproduced in a two-sided copy mode. Further, in the ordinary one-sided copy mode, the resulting copies are put in order from the top to the bottom of the stack simply by sequentially reading the last page to the first page in this sequence out of the memory of the image processing unit 56, forming images, and reproducing them.

The illustrative embodiment is advantageous over a prior art two-sided copying method concerning the processing rate also. In a two-sided copy mode for producing a single two-sided copy with two independent documents in distinction from a repeat mode, a prior art method feeds a single document to a glass platen by an ADF, forms an image of the document on a photoconductive element, reproduces the image on one side of a paper sheet, discharges the resulting one-sided copy onto a two-sided tray, refeeds the one-sided copy from the two-sided tray, causes the ADF to start feeding the next document in synchronism with the refeeding of the copy, and reproduces an image associated with the second document on the other side of the one-sided copy. Such a procedure is repeated with each two documents resulting in an extremely low processing rate, as previously stated.

In contrast, all that is required with the illustrative embodiment is continuously reading a stack of documents 18 only once at the beginning of a copying operation, storing the resulting image data in a memory, and reading them out in a suitable manner to repeat a sequence of image forming steps. More specifically, the ADF 16 does not have to await the end of image forming steps as performed by the image forming device 22 or to be timed to the latter while the latter does not have to be operated in synchronism with the former, whereby the image forming processing can be executed continuously and therefore at an extremely high rate. That is, the required processing time is not more than the collective document reading time plus the copying time for the desired number of copies based on the continuous processing rate. In this connection, in the previously discussed one-to-one copy mode in which the digital copier 10 is operated at the continuous processing rate for producing one two-sided copy from each two one-sided documents, the processing rate is not lowered to more than 60% to 80%. Such a processing rate is substantially equal to the processing rate (i.e., 60% to 80% of the continuous processing rate) which is associated with a copy mode for producing a single one-sided copy with each single one-sided document.

As described above, the illustrative embodiment uses an existing ADF, a two-sided tray and related structure and collectively reads a stack of documents by causing the ADF to continuously feed them only once, stores image data representative of the documents in a memory, in a two-sided copy mode sequentially reproduces odd pages on one side of paper sheets from the highest-numbered page to the lowest-numbered page, refeeds the resulting one-sided copies from the lowest-numbered page, and reproduces even pages on the other side of the paper sheets from the lowest-numbered page. This kind of sequence achieves various unprecedented advantages as enumerated below:

(1) The reliability required of the ADF is not strict so that a relatively inexpensive ADF suffices;

(2) The processing time for a two-sided copy mode is reduced because consecutive documents are processed continuously without any waiting time;

(3) Two-sided copies are always regularly produced in the order of pages without regard to the feeding system of the ADF or the odd and even pages of documents.

SECOND EMBODIMENT

In a second embodiment, digital image data representative of the documents 18 and outputted by way of the ADF 16, scanner 20 and CCD image sensor 54 are written in the memory which is built in the image processing unit 56. Briefly, the image forming device 22 sequentially reproduces the odd pages of the documents 18 on one side of paper sheets 28 and then sequentially reproduces the even pages of the documents 18 on the other side of the same paper sheets 28, as has been the case with the first embodiment. However, in this particular embodiment, the odd pages are reproduced the lowest-numbered page being first, and the even pages are reproduced the highest-numbered page being first. Details of such a procedure will be described with reference to FIG. 5.

Figure 5B:
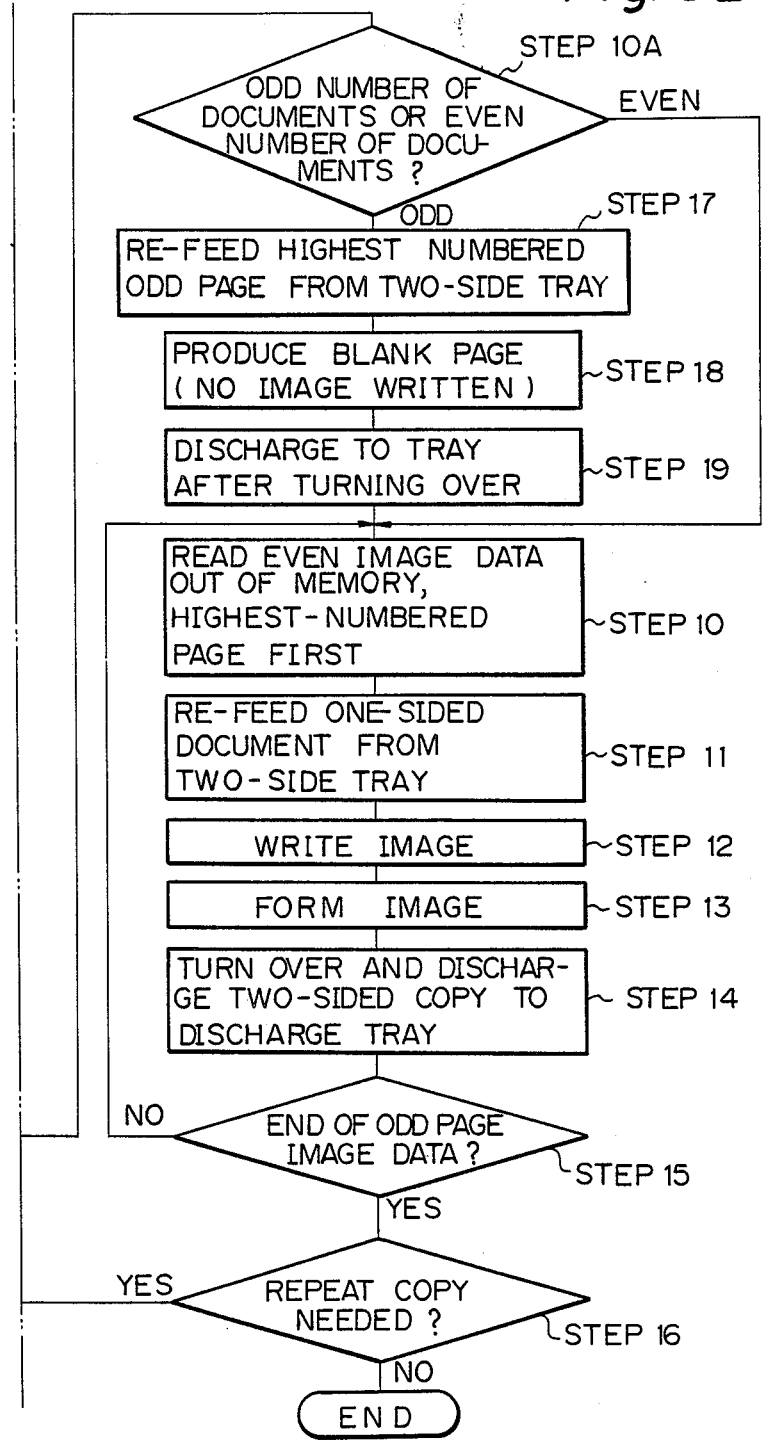
FIG. 5 is a flowchart useful for understanding the operation of a second embodiment of the present invention.

In FIG. 5, when a copy button (not shown) of the copier 10 is pressed, the documents 18 stacked face up on the document table 34 are sequentially fed by the ADF 16 to the glass platen 14 (STEP 1). The document 18 laid on the glass platen 14 is read by the CCD image sensor 54 of the scanner 20 and then stored in the memory of the image processing unit 56 in the form of digital image data (STEP 2). Such a reading operation is repeated for each of the successive pages of the documents 18. As the last one of the documents 18 is read and memorized in the form of digital data, the reading step is ended by driving the last document 18 out of the glass platen 14. (STEPs 3 and 4). Thereafter, the image forming device 22 is actuated to effect an image forming process. Specifically, the odd pages of the documents 18 are sequentially reproduced on one side of paper sheets 28 and, then, the even pages of the documents 18 are reproduced on the other side of the paper sheets 28. The image data representative of the odd pages are sequentially read out of the memory of the image processing unit 56, the lowest-numbered odd page being first (STEP 5). The optics member 62 writes an image associated with the odd page in the drum 24 (STEP 6) and, then, the developing unit 64, transfer and separation charger 66 and fixing unit 82 cooperate to reproduce the image on one side of a paper sheet 28 (STEP 7). The resulting paper sheet or one-sided copy 28 is driven out to the two-side tray 32 of the two-side tray device 30 (STEP 8). These consecutive steps are sequentially repeated with, for example, the first page P1, third page P3 and fifth page P5 in this order. Hence, the one-sided copies 28 on the two-side tray 32 are sequentially stacked in the order of the first page P1 to the fifth page P5.

After one-sided copies 28 each being associated with a different odd page have been produced and sequentially stacked on the one-side tray 32 in the above-stated order, a procedure for reproducing the even pages on the other side of the one-sided copies 28 begins. First, whether the number of documents is odd or even is determined (STEP 10A). If it is odd, the program advances to a STEP 10. While the image data representative of the even pages are sequentially read out of the memory in the same manner as the data associated with the odd pages, the former is read out in the reverse order to the latter, i.e. from the highest-numbered page to the lowest-numbered page such as the sixth page P6, then the fourth page P4 and then the second page P6 (STEP 10). This is followed by refeeding the one-sided copies 18 from the two-sided tray 32 (STEP 11). Since the one-sided copies 28 are sequentially refed in the order of the fifth page P5, third page P3 and first page P1 by the pick-up roller 94 which is located above the copies 28, the copying order in the event of reproduction on the other side of the copies 28 corresponds to the order of refeeding from the two-sided tray 32 with respect to the pages. More specifically, the sixth page P6 is reproduced on the other side of the fifth page P5, and the fourth page P4 is reproduced on the other side of the third page P3. After the optics member 62 has written an image associated with any even page on the drum 24 (STEP 12), the developing unit 64, transfer and separation charger 66 and fixing unit 8 reproduce that image on the one-sided copy 18 (STEP 13). The resulting two-sided copy 28 is turned over by the reversing device 85 and then fed out to the discharge tray 86 (STEP 14). On the other hand, when the number of documents is odd as decided in STEP 10A, the one-sided copy 28 of the highest-numbered odd page is fed out from the two-sided tray 32 first. For example, the fifth page P5, third page P3 and first page P1 are sequentially fed in this order (STEP 17). No image is reproduced on the back of the one-sided copy 28 refed first, e.g. the sixth page P6 (STEP 18). Then, this one-sided copy 28 is turned over by the reversing device 85 and discharged to the tray 86 (STEP 19). The next one-sided copy and the subsequent one-sided copies are processed as represented by STEPS 10 to 14. The two-sided copying procedure is completed as soon as all of the even pages are reproduced (STEP 15). When a repeat mode is selected, i.e., when it is desired to produce a plurality of sets of two-sided copies with the stack of documents 18 loaded on the document table 34 of the ADF 16 (STEP 16), the program is returned to STEP 5. More specifically, the document transporting step to the document reading step are not repeated for each of the desired number of sets of two-sided copies and, instead, only the step of reading image data which have been stored in the memory by a single document transporting operation to the step of forming an image is repeated for the desired number of sets of copies. Hence, even in a repeat copy mode, the transport of the documents 18 by the ADF 16 and the image reading by the scanner 20, CCD image sensor 54 and image forming device 56 need only to be performed once each.

With this particular embodiment, too, whether the ADF 16 be of the type transporting a document bearing the last page first or transporting a document bearing the first page first, the resulting copies in a two-sided copy mode are automatically put in order because they are produced as shown in FIG. 4A for those copies the last page of which is odd or as shown in FIG. 4B for those copies the last page of which is even. This prevents the back of the first page from being left blank even when a stack of documents the last page of which is odd are reproduced in a two-sided copy mode. Further, in the ordinary one-sided copy mode, the resulting copies are put in order from the top to the bottom of the stack simply by sequentially reading the last page to the first page in this sequence out of the memory of the image processing unit 56, forming images, and reproducing them.

Further, all that is required with the illustrative embodiment also is continuously reading a stack of documents 18 only once at the beginning of copying operation, storing the resulting image data in a memory, and reading them out in a suitable manner to repeat a sequence of image forming steps. More specifically, the ADF 16 does not have to await the end of image forming steps as performed by the image forming device 22 or to be timed to the latter while the latter does not have to be operated in synchronism with the former, whereby the image forming processing can be executed continuously and therefore at an extremely high rate. That is, the required processing time is not more than the collective document reading time plus the copying time for the desired number of copies based on the continuous processing rate.

As described above, the second embodiment uses an existing ADF, two-sided tray and the like and collectively reads a stack of documents by causing the ADF to continuously feed them only once, stores image data representative of the documents in a memory, in a two-sided copy mode sequentially reproduces odd pages on one side of paper sheets from the lowest-numbered page to the highest-numbered page, refeeds the resulting one-sided copies from the highest-numbered page, and reproduces even pages on the other side of the paper sheets from the highest-numbered page. This kind of sequence achieves various unprecedented advantages as enumerated below:

(1) The reliability required of the ADF is not strict so that a relatively inexpensive ADF suffices;

(2) The processing time for a two-sided copy mode is reduced because consecutive documents are processed continuously without any waiting time;

(3) Two-sided copies are always regularly produced in the order of pages without regard to the feeding system of the ADF or the odd and even pages of documents.

THIRD EMBODIMENT

In a third embodiment, digital image data representative of the documents 18 and outputted by way of the ADF 16, scanner 20 and CCD image sensor 54 are written in the memory which is built into the image processing unit 56. Briefly, the image forming device 22 sequentially reproduces the odd pages of the documents 18 on one side of paper sheets 28 and then sequentially reproduces the even pages of the documents 18 on the other side of the same paper sheets 28, as has been the case with the first and second embodiments. However, in this particular embodiment, the odd pages are reproduced the highest-numbered page being first, and the even pages are reproduced the highest-numbered page being first. Details of such a procedure will be described with reference to FIG. 6.

Figure 6A:
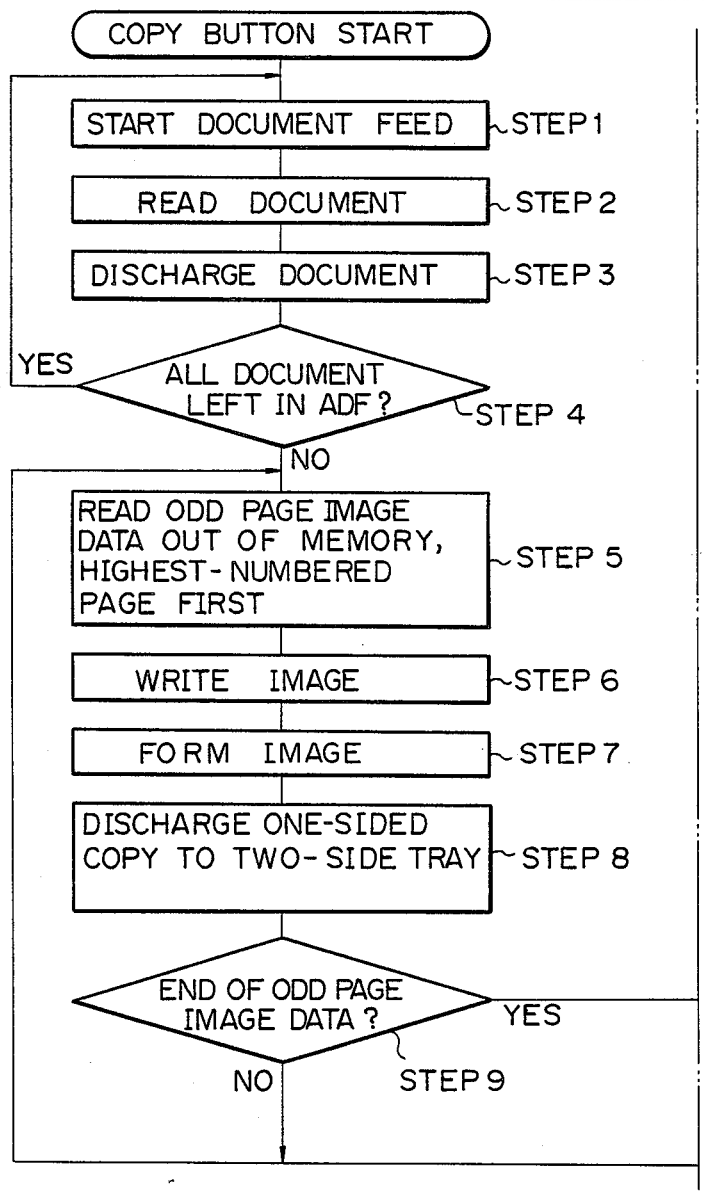
FIG. 6 is a flowchart showing the operation of a third embodiment of the present invention.

In FIG. 6, when a copy button (not shown) of the copier 10 is pressed, the documents 18 stacked face up on the document table 34 are sequentially fed by the ADF 16 to the glass platen 14 (STEP 1). The document 18 laid on the glass platen 14 is read by the CCD image sensor 54 of the scanner 20 and then stored in the memory of the image processing unit 56 in the form of digital image data (STEP 2). Such a reading operation is repeated for each of the successive pages of the documents 18. As the last one of the documents 18 is read and memorized in the form of digital data, the reading step is ended by driving the last document 18 out of the glass platen 14. (STEPs 3 and 4).

Thereafter, the image forming device 22 is actuated to effect an image forming process. Specifically, the odd pages of the documents 18 are sequentially reproduced on one side of paper sheets 28 and, then, the even pages of the documents 18 are reproduced on the other side of the paper sheets 28. The image data representative of the odd pages are sequentially read out of the memory of the image processing unit 56, the highest-numbered odd page being first (STEP 5). The optics member 62 writes an image associated with the odd page in the drum 24 (STEP 6) and, then, the developing unit 64, transfer and separation charger 66 and fixing unit 82 cooperate to reproduce the image on one side of a paper sheet 28 (STEP 7). The resulting paper sheet or one-sided copy 28 is driven out to the two-sided tray 32 of the two-sided tray device 30 (STEP 8). These consecutive steps are sequentially repeated with, for example, the fifth page P5, third page P3 and first page P1 in this order. Hence, the one-sided copies 28 on the two-sided tray 32 are sequentially stacked in the order of the fifth page P5 to the first page P1.

After one-sided copies 28 each being associated with a different odd page have been produced and sequentially stacked on the one-sided tray 32 in the above-stated order, a procedure for reproducing the even pages on the other side of the one-sided copies 28 begins. First, whether the number of documents is odd or even is determined (STEP 10A). If it is odd, the program advances to a STEP 10. While the image data representative of the even pages are sequentially read out of the memory in the same manner as the data associated with the odd pages, the former is read out in the reverse order to the latter, i.e. from the highest-numbered page to the lowest-numbered page such as the sixth page P6, then the fourth page P4 and then the second page P6 (STEP 10). This is followed by refeeding the one-sided copies 18 from the two-sided tray 32 (STEP 11). Since the one-sided copies 28 are sequentially refed in the order of the fifth page P5, third page P3 and first page P1 by the pick-up roller 94a of the copier 10 which is located below the copies 28, the copying order in the event of reproduction on the other side of the copies 28 corresponds to the order of refeeding from the two-side tray 32 with respect to the pages. More specifically, the sixth page P6 is reproduced on the other side of the fifth page P5, and the fourth page P4 is reproduced on the other side of the third page P3. After the optics member 62 has written an image associated with any even page on the drum 24 (STEP 12), the developing unit 64, transfer and separation charger 66 and fixing unit 8 reproduce that image on the one-sided copy 18 (STEP 13). The resulting two-sided copy 28 turned over by the reversing device 85 and then fed out to the discharge tray 86 (STEP 14). On the other hand, when the number of documents is odd as decided in STEP 10A, the one-sided copy 28 of the highest-numbered odd page is fed out from the two-sided tray 32 first. For example, the fifth page P5, third page P3 and first page P1 are sequentially fed in this order (STEP 17). No image is reproduced on the back of the one-sided copy 28 refed first, e.g. the sixth page P6 (STEP 18). Then, this one-sided copy 28 is turned over by the reversing device 85 and discharged to the tray 86 (STEP 19). The next one-sided copy and the subsequent one-sided copies are processed as represented by STEPS 10 to 14. The two-sided copying procedure is completed as soon as all of the even pages are reproduced (STEP 15). When a repeat mode is selected, i.e., when it is desired to produce a plurality of sets of two-sided copies with the stack of documents 18 loaded on the document table 34 of the ADF 16 (STEP 16), the program is returned to STEP 5. More specifically, the document transporting step to the document reading step are not repeated for each of the desired number of sets of two-sided copies and, instead, only the step of reading image data which have been stored in the memory by a single document transporting operation to the step of forming an image is repeated for the desired number of sets of copies. Hence, even in a repeat copy mode, the transport of the documents 18 by the ADF 16 and the image reading by the scanner 20, CCD image sensor 54 and image forming device 56 need only to be performed once each.

With the third embodiment, too, whether the ADF 16 be of the type transporting a document bearing the last page first or transporting a document bearing the first page first, the resulting copies in a two-sided copy mode are automatically put in order because they are produced as shown in FIG. 4A for those copies the last page of which is odd or as shown in FIG. 4B for those copies the last page of which is even. This prevents the back of the first page from being left blank even when a stack of documents the last page of which is odd are reproduced in a two-sided copy mode. Further, in the ordinary one-sided copy mode, the resulting copies are put in order from the top to the bottom of the stack simply by sequentially reading the last page to the first page in this sequence out of the memory of the image processing unit 56, forming images, and reproducing them.

Further, all that is required with the illustrative embodiment also is continuously reading a stack of documents 18 only once at the beginning of a copying operation, storing the resulting image data in a memory, and reading them out in a suitable manner to repeat a sequence of image forming steps. More specifically, the ADF 16 does not have to await the end of image forming steps as performed by the image forming device 22 or to be timed to the latter while the latter does not have to be operated in synchronism with the former, whereby the image forming processing can be executed continuously and therefore at an extremely high rate. That is, the required processing time is not more than the collective document reading time plus the copying time for the desired number of copies based on the continuous processing rate.

As described above, the third embodiment uses an existing ADF, a two-sided tray and the like and collectively reads a stack of documents by causing the ADF to continuously feed them only once, stores image data representative of the documents in a memory, in a two-sided copy mode sequentially reproduces odd pages on one side of paper sheets from the highest-numbered page to the lowest-numbered page, refeeds the resulting one-sided copies from the highest-numbered page, and reproduces even pages on the other side of the paper sheets from the highest-numbered page. This kind of sequence achieves various unprecedented advantages as enumerated below:

(1) The reliability required of the ADF is not strict so that a relatively inexpensive ADF suffices;

(2) The processing time for a two-sided copy mode is reduced because consecutive documents are processed continuously without any waiting time;

(3) Two-sided copies are always regularly produced in the order of pages without regard to the feeding system of the ADF or the odd and even pages of documents.

FOURTH EMBODIMENT

Figure 7A:
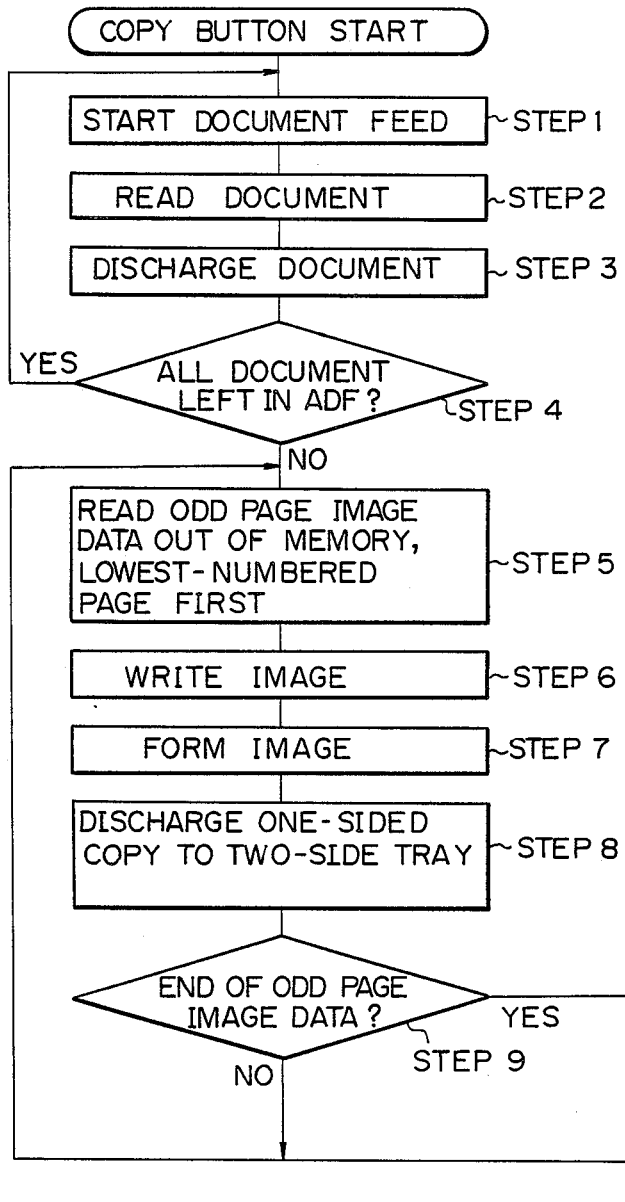
FIG. 7 is a flowchart showing the operation of a fourth embodiment of the present invention.
Figure 7B:
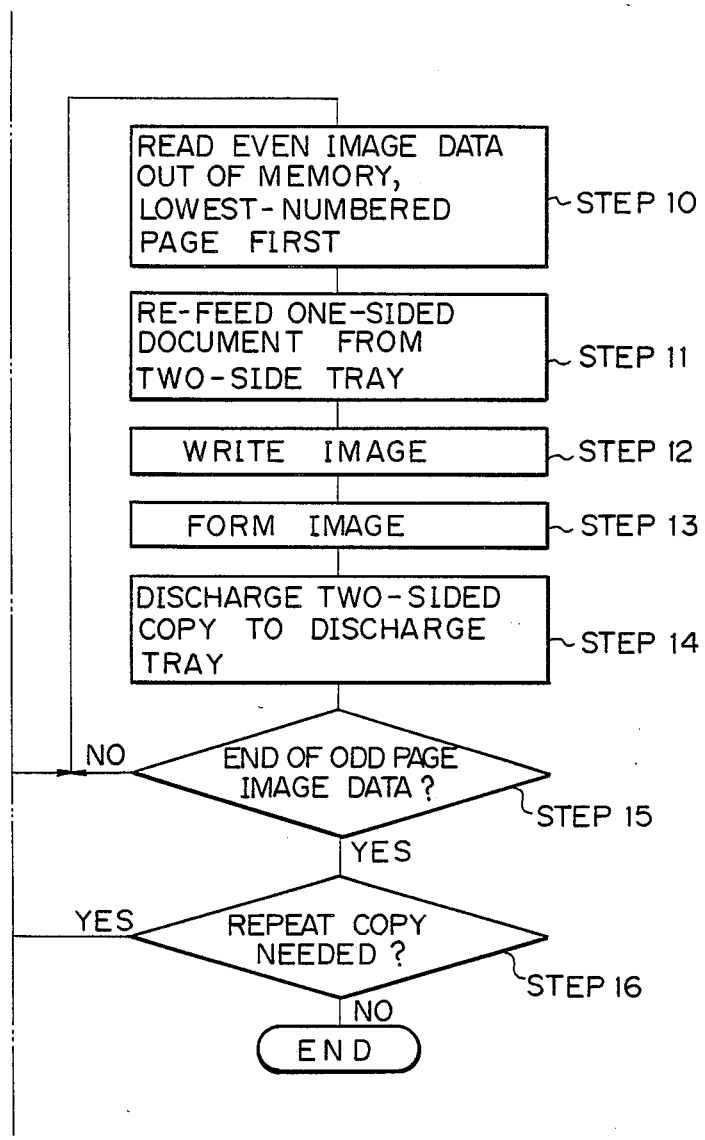

In a fourth embodiment, digital image data representative of the documents 18 and outputted by way of the ADF 16, scanner 20 and CCD image sensor 54 are written in the memory which is built in the image processing unit 56. Briefly, the image forming device 22 sequentially reproduces the odd pages of the documents 18 on one side of paper sheets 28 and then sequentially reproduces the even pages of the documents 18 on the other side of the same paper sheets 28. The odd pages are reproduced the lowest-numbered page being first, and the even pages are reproduced the lowest-numbered page being first. Details of such a procedure will be described with reference to FIG. 7.

In FIG. 2, when a copy button (not shown) of the copier 10 is pressed, the documents 18 stacked face up on the document table 34 are sequentially fed by the ADF 16 to the glass platen 14 (STEP 1). The document 18 laid on the glass platen 14 is read by the CCD image sensor 54 of the scanner 20 and then stored in the memory of the image processing unit 56 in the form of digital image data (STEP 2). Such reading operation is repeated for each of the successive pages of the documents 18. As the last one of the documents 18 is read and memorized in the form of digital data, the reading step is ended by driving the last document 18 out of the glass platen 14. (STEPs 3 and 4).

Thereafter, the image forming device 22 is actuated to effect an image forming process. Specifically, the odd pages of the documents 18 are sequentially reproduced on one side of paper sheets 28 and, then, the even pages of the documents 18 are reproduced on the other side of the paper sheets 28. The image data representative of the odd pages are sequentially read out of the memory of the image processing unit 56, the lowest-numbered odd page first (STEP 5). The optics 62 writes an image associated with the odd page in the drum 24 (STEP 6) and, then, the developing unit 64, transfer and separation charger 66 and fixing unit 82 cooperate to reproduce the image on one side of a paper sheet 28 (STEP 7). The resulting paper sheet or one-sided copy 28 is driven out to the two-sided tray 32 of the two-sided tray device 30 (STEP 8). These consecutive steps are sequentially repeated with, for example, the first page P1, third page P3 and fifth page P5 in this order. Hence, the one-sided copies 28 on the two-sided tray 32 are sequentially stacked in the order of the first page P1 to the fifth page P5.

After one-sided copies 28 each being associated with a different odd page have been produced and sequentially stacked on the one-sided tray 32 in the above-stated order, a procedure for reproducing the even pages on the other side of the one-sided copies 28 begins. While the image data representative of the even pages are sequentially read out of the memory in the same manner as the data associated with the odd pages, the former is read out in the reverse order to the latter, i.e. from the lowest-numbered page to the highest-numbered page such as the second page P2, then the fourth page P4 and then the sixth page P6 (STEP 10). This is followed by refeeding the one-sided copies 18 from the two-side tray 32 (STEP 11). Since the one-sided copies 28 are sequentially refed in the order of the first page P1, third page P3 and fifth page P5 by the pick-up roller 94a which is located below the copies 28, the copying order in the event of reproduction on the other side of the copies 28 corresponds to the order of refeeding from the two-side tray 32 with respect to the pages. More specifically, the second page P2 is reproduced on the other side of the first page P1, the fourth page P4 on the other side of the third page P3, and the sixth page P6 on the other side of the fifth page P5. After the optics member 62 has written an image associated with any even page on the drum 24 (STEP 12), the developing unit 64, transfer and separation charger 66 and fixing unit 8 reproduce that image on the one-sided copy 18 (STEP 13). The resulting two-sided copy 28 is fed out to the discharge tray 86 (STEP 14). The two-sided copying procedure is completed as soon as all of the even pages are reproduced (STEP 15). When a repeat mode is selected, i.e., when it is desired to produce a plurality of sets of two-sided copies with the stack of documents 18 loaded on the document table 34 of the ADF 16 (STEP 16), the program is returned to STEP 5. More specifically, the document transporting step to the document reading step are not repeated for each of the desired number of sets of two-sided copies and, instead, only the step of reading image data which have been stored in the memory by a single document transporting operation to the step of forming an image is repeated for the desired number of sets of copies. Hence, even in a repeat copy mode, the transport of the documents 18 by the ADF 16 and the image reading by the scanner 20, CCD image sensor 54 and image forming device 56 need only to be performed once each.

With the fourth embodiment, too, whether the ADF 16 be of the type transporting a document bearing the last page first or transporting a document bearing the first page first, the resulting copies in a two-sided copy mode are automatically put in order because they are produced as shown in FIG. 4A for those copies the last page of which is odd or as shown in FIG. 4B for those copies the last page of which is even. This prevents the back of the first page from being left blank even when a stack of documents the last page of which is odd are reproduced in a two-sided copy mode. Further, in the ordinary one-sided copy mode, the resulting copies are put in order from the top to the bottom of the stack simply by sequentially reading the last page to the first page in this sequence out of the memory of the image processing unit 56, forming images, and reproducing them.

Further, all that is required with the illustrative embodiment is continuously reading a stack of documents 18 only once at the beginning of a copying operation, storing the resulting image data in a memory, and reading them out in a suitable manner to repeat a sequence of image forming steps. More specifically, the ADF 16 does not have to await the end of image forming steps as performed by the image forming device 22 or to be timed to the latter while the latter does not have to be operated in synchronism with the former, whereby the image forming processing can be executed continuously and therefore at an extremely high rate. That is, the required processing time is not more than the collective document reading time plus the copying time for the desired number of copies based on the continuous processing rate.

As described above, the fourth embodiment uses an existing ADF, two-sided tray and the like and collectively reads a stack of documents by causing the ADF to continuously feed them only once, stores image data representative of the documents in a memory, in a two-sided copy mode sequentially reproduces odd pages on one side of paper sheets from the lowest-numbered page to the lowest-numbered page, refeeds the resulting one-sided copies from the lowest-numbered page, and reproduces even pages on the other side of the paper sheets from the lowest-numbered page. This kind of sequence achieves various unprecedented advantages as enumerated below:

(1) The reliability required of the ADF is not strict so that a relatively inexpensive ADF suffices;

(2) The processing time for a two-sided copy mode is reduced because consecutive documents are processed continuously without any waiting time;

(3) Two-sided copies are always regularly produced in the order of pages without regard to the feeding system of the ADF or the odd and even pages of documents.

Various modifications will become possible for those skilled in the art after receiving the teachings of the present disclosure without departing from the scope thereof.

What is claimed is:

1. A two-sided copying method applicable to an image recording apparatus for reproducing images of documents having a predetermined number of pages on both sides of individual paper sheets to produce two-sided copies and discharging the two-sided copies in the order of the pages, wherein said method comprises:
   (a) reading the images of the documents in the form of image data;
   (b) storing the image data;
   (c) reading the stored image data representative of one of odd pages and even pages of the documents in a first predetermined order of the pages;
   (d) reproducing the read image data on one side of the individual paper sheets in the first predetermined order of the pages to produce one-sided copies;
   (e) reading the stored image data representative of the other of the odd pages and even pages in a second predetermined order of the pages;
   (f) sequentially refeeding the one-sided copies in a third predetermined order; and
   (g) reproducing the read image data on the other side of the individual paper sheets in the third predetermined order so as to produce two-sided copies.

2. A method as claimed in claim 1, wherein the image data in step (c) is the image data representative of odd pages and the first predetermined order of the pages begins with a high-numbered page, the other image data in step (e) being the image data representative of the even pages and the second predetermined order of the pages beginning with a low-numbered page, the third predetermined order in step (f) beginning with the paper sheet bearing a low-numbered page.

3. A method as claimed in claim 1, which further comprises:
   (h) determining whether the number of documents is odd or even after step (d); and
   (i) discharging the two-sided copies produced by step (g) after turning over the two-sided copies.

4. A method as claimed in claim 3, wherein the one image data in step (c) is the image data representative of the odd pages and the first predetermined order of page begins with a low-numbered page, the other image data in step (e) being the image data representative of the even pages and the second predetermined order beginning with a high-numbered page, the third predetermined order in step (f) beginning with the paper sheet bearing a high-numbered page, wherein no image is reproduced in step (g) on the other side of the one-sided copy refed last in step (f) when the number of documents is determined to be odd in step (h).

5. A method as claimed in claim 3, wherein the one image data in step (c) is the image data representative of the odd pages and the first predetermined order of the pages begins with a high-numbered page, the other image data in step (f) being the image data representative of the even pages and the second predetermined order of the pages beginning with a high-numbered page, the third predetermined order in step (f) beginning with the paper sheet bearing a high-numbered page, wherein no image is reproduced in step (g) on the other side of the one-sided copy refed first in step (g) when the number of documents is determined to be odd in step (h).

6. A method as claimed in claim 1, wherein the one image data in step (c) is the image data representative of the odd pages and the first predetermined order of page begins with a low-numbered page, the other image data in step (e) being the image data representative of the odd pages and the second predetermined order of the pages beginning with a low-numbered page, the third predetermined order in step (f) beginning with the paper sheet bearing a low-numbered page.

7. A method as claimed in claim 1, which further comprises (h) automatically feeding the documents one by one to an image reader of said image recording apparatus before step (a).

8. A method as claimed in claim 1, wherein step (a) comprises (h) photoelectrically transforming the images of the documents into digital image data.

9. A method as claimed in claim 1, further comprising (h) temporarily stacking the one-sided copies produced in step (d) on a two-side tray device of said image recording apparatus.

10. A method as claimed in claim 1, wherein each of steps (d) and (g) comprises (h) producing the image data read out in steps (c) and (e) on an image carrier of said image recording apparatus, and developing, transferring, and fixing the data.

11. A two-sided image reproducing apparatus for reproducing images of documents having a predetermined number of pages on both sides of individual paper sheets to produce two-sided copies and discharging the two-sided copies in the order of the pages, which comprises:
   a first reading mechanism for reading the images of the documents in the form of image data;
   a storage device for storing the image data;
   a second reading mechanism for reading the stored image data representative of one of odd pages and even pages of the document in the first predetermined order of the pages;
   means for reproducing the read image data on one side of the individual paper sheets in the first predetermined order of the pages to produce one-sided copies;
   a third reading mechanism for reading the stored image data representative of the other of the odd pages and even pages in a second predetermined order of the pages;
   a feeding mechanism for sequentially refeeding the one-sided copies in a third predetermined order; and
   means for reproducing the read image data on the other side of the individual paper sheets in the third predetermined order so as to produce two-sided copies.

12. An apparatus as claimed in claim 11, wherein said image recording apparatus comprises a digital copier.

* * * * *